United States Patent [19]

Hankison et al.

[11] 3,977,433
[45] Aug. 31, 1976

[54] MULTI-PURPOSE VALVE STRUCTURE

[75] Inventors: Paul M. Hankison, Peters Township, Washington County; William Foster Walker, Bethel Park Borough, both of Pa.

[73] Assignee: Hankison Corporation

[22] Filed: Oct. 4, 1974

[21] Appl. No.: 512,104

[52] U.S. Cl. .................. 137/625.29; 251/367
[51] Int. Cl.² ................................ F16K 11/07
[58] Field of Search ........... 137/625.27, 625.5, 269, 137/625.48, 625.25, 625.69, 625.43, 625.29; 251/318, 367

[56] References Cited
UNITED STATES PATENTS

| | | | |
|---|---|---|---|
| 2,542,391 | 2/1951 | Brown | 137/625.29 |
| 2,553,458 | 5/1951 | Jordan | 137/625.29 |
| 2,702,049 | 2/1955 | Seeloff | 137/625.69 |
| 2,722,514 | 11/1955 | Sloan | 137/625.29 X |
| 2,855,042 | 10/1958 | Kryzer | 137/625.48 X |
| 2,920,652 | 1/1960 | Rudolick et al. | 137/625.29 |
| 3,140,728 | 7/1964 | Webb | 137/625.69 |
| 3,174,510 | 3/1965 | Nelson | 137/625.69 |
| 3,283,783 | 11/1966 | Kent | 137/625.5 X |
| 3,542,065 | 11/1970 | Holbrook | 137/625.69 X |
| 3,650,287 | 3/1972 | Greenawalt | 137/625.29 X |

*Primary Examiner*—Martin P. Schwadron
*Assistant Examiner*—Robert J. Miller
*Attorney, Agent, or Firm*—Donn J. Smith

[57] ABSTRACT

A valve structure comprises an elongated housing having a passage extending therethrough, and a control member mounted in the passage for rectilinear movement with respect to the housing. The housing has a plurality of spaced valve ports extending therethrough in communication with the housing passage. A plurality of sealing means are non-uniformly spaced along the length of the control member for movement therewith, with each of the sealing means sealingly engaging adjacent wall surfaces of the housing passage. The sealing means in one position of the control member define a given flow circuit among the valve ports, and in another position of the control member its sealing means define a different flow circuit among the valve ports.

17 Claims, 9 Drawing Figures

MULTI-PURPOSE VALVE STRUCTURE

The present invention relates to a multi-purpose valve structure, and more particularly to a valve construction of the character described capable of performing a multiple of valving functions, including but not limited to by-pass, cross-over three-way and four-way, with a minimum of component parts and a minimum of structural revision between one function and another.

Our novel valve structure is particularly useful for by-pass applications wherein it is desired quickly and periodically to couple and decouple a fluid-utilizing device from a given system. Basically, three stop valves can be employed for this purpose, together with fittings, piping and related components. Our novel valve construction for this purpose elimiates these conventional components and saves considerable labor in the installation of the system.

Our novel valve structure is also useful in cross-over networks, for example wherein two or more fluid handling components are utilized alternatingly, such that one is on line and the other is on standby or some other reserve capacity. For example, the cross-over function of our valve construction is especially useful in a system utilizing a pair of desiccant containing vessels for dehydration of air or other fluids. In this type of system one of the desiccant vessels is usually on line, while the other is being regenerated by a reverse flow of the product air or gas, usually at a reduced pressure. In this situation, the valve structure of our invention substitutes for a pair of four-way valves and associated plumbing components together with considerable less expenditure of labor in the initial installation.

In each of the preceding examples and in other applications the valve structure is more easily and reliably manipulated with intendant reduction in operating labor and potentiality of human error.

One unexpected feature of our novel valve structure is its use of a rectilinear member or spool having a relatively short throw. The forces exerted internally of the valve structure upon the spool or central component are balanced such that the valve structure, even when employed in a high pressure system, can be switched manually with very little effort. With the short throw of the valve's control member and its ease of movement, the invention is admirably suited for remote control thereof, particularly with low pressure pneumatic control circuitry.

Another unexpected feature of the invention is the use of a multi-sectioned housing in our novel valve structure in avoidance of complicated machining procedures (if the housing be made of metal). The valve housing, moreover, is sectioned in such manner that the individual sections thereof can be readily molded from a suitable plastic or other structural material. This eliminates altogether the need for machining. An ability to use duplicate housing sections constitutes another unexpected result of this feature of the invention. Likewise unexpected, is the modification of the multi-sectioned valve housing for the respective valve functions such as by-pass or cross-over stemming from a meme spatial rearrangement of the housing sections. The housing sections, when used, are aligned, joined, and sealed in a unique fashion.

Another unexpected feature of the invention is the provision of a spool or control member of uniform outer configuration for the valving modifications of our valve structure. The same control member in fact can be employed in a number of structural and functional modifications of our valve structure, with at most a minor structural change in the control member. Where a molded control member is desired, a single mode can be used for the control member of a number of valve modifications.

To accomplish these desirable ends and to overcome the disadvantages of the prior art we provide a valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means non-uniformly spaced along the length of said control member for movement therewith, each of said sealing means sealingly engaging adjacent wall surfaces of said passage means, said sealing means in one position of said control member defining a given flow circuit among said valve ports, and said sealing means in another position of said control member defining a different flow circuit among said valve ports.

We also desirably provide a similar valve structure including two pairs of said ports disposed in said housing, said reduced control member portions being disposed in one position of said control member to define said given fluid circuit as comprising generally parallel flows through respective generally transverse pairs of said pairs of said ports, one of said reduced portions having sufficient length to define said different circuit in another position of said control member as a by-passing flow between a non-juxtaposed pair of said ports.

We also desirably provide a similar valve structure including at least two pairs of said ports, said different fluid circuit including a pair of cross-over fluid paths, one of said cross-over paths extending between a given non-juxtaposed pair of ports on opposite sides of said housing, the other cross-over path extending between another non-juxtaposed pair of said ports through an internal passage of said control member.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same wherein.

Figure 1:
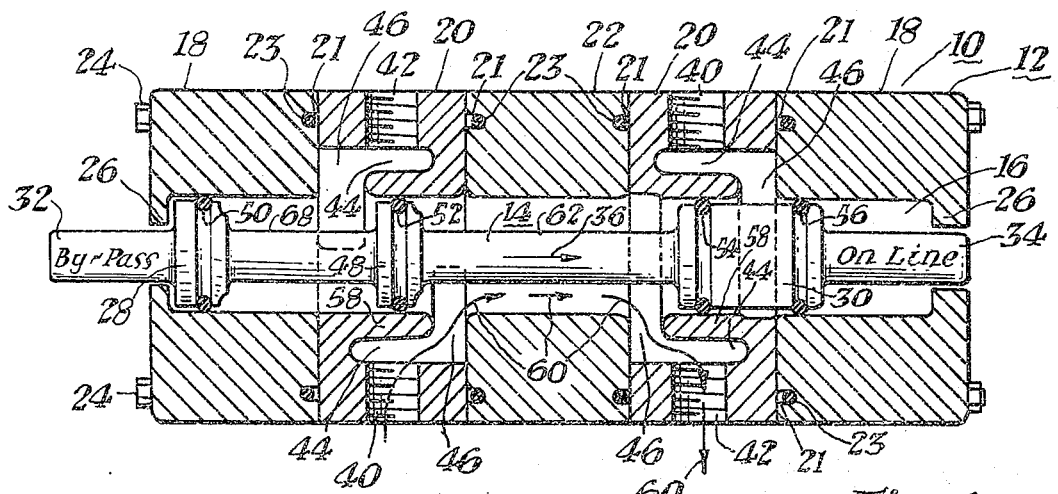
FIG. 1 is a longitudinally sectioned view of one form of our novel valve construction, shown here in its "by-pass" mode.
Figure 2:
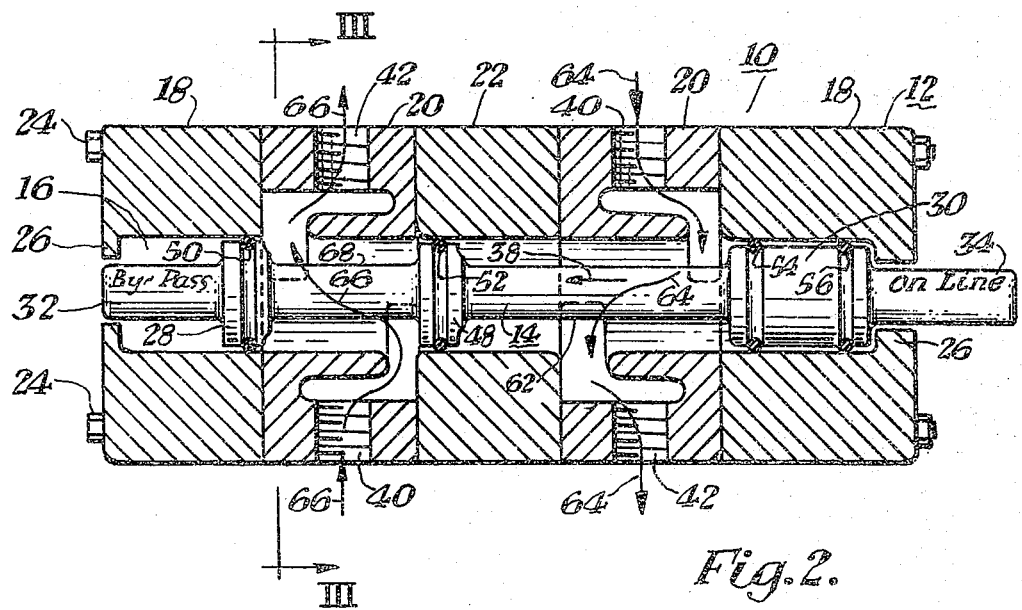
FIG. 2 is a similar view of the valve construction of FIG. 1 but shown here in the "on-line" mode.
Figure 3:
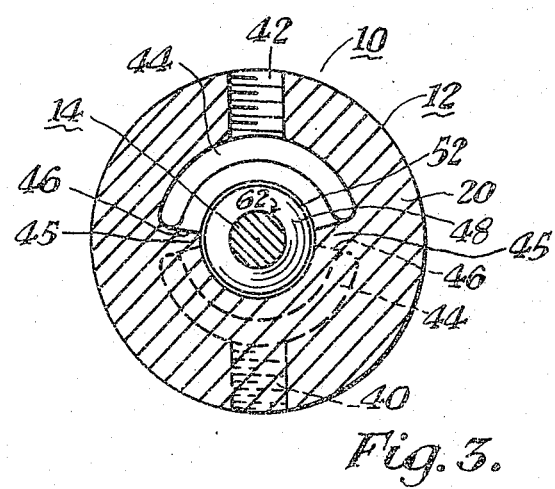
FIG. 3 is a cross-sectional view of the valve construction as shown in FIG. 2 and taken along reference line III—III thereof.

With initial reference now to FIGS. 1–3 of the drawings, the exemplary valve structure 10 shown therein comprises a housing 12 and a movable flow control member 14. The housing 12 defines a desirably central longitudinal passage 16 in which the control member 14 is mounted for rectilinear movement. In the illustrated modification, the housing 12 is assembled from five sections 18, 20, 22. The end sections 18 and the valve port or valving sections 20 can be made identical respectively, although their positions in the housing configuration 12 are relatively reversed. The housing sections 18–22 are secured together by a number of through bolts 24. Four such bolts are employed in this example, as evident from FIG. 3, although a different number obviously can be employed.

Use of the housing sections 18–22 facilitates manufacture of the several passages of the housing 12 but is in no wise limitative of the invention. The several housing sections can be more easily machined (if made of metal) in this condition. Preferably, the housing sections 18–22 are molded from a suitable structural plastic, such as Nylon, in which case the need for machining is completely eliminated. By using duplicate housing sections 18, 18 and 20, 20, the number of molds for the housing sections are unexpectedly reduced.

Figure 5:
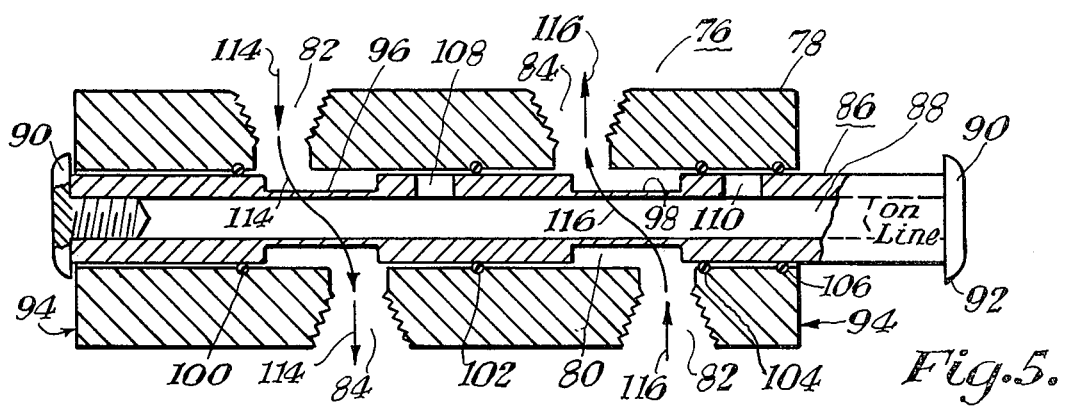
FIG. 5 is a similar view of the valve construction of FIG. 4 but shown here in its on-line mode.
Figure 4:
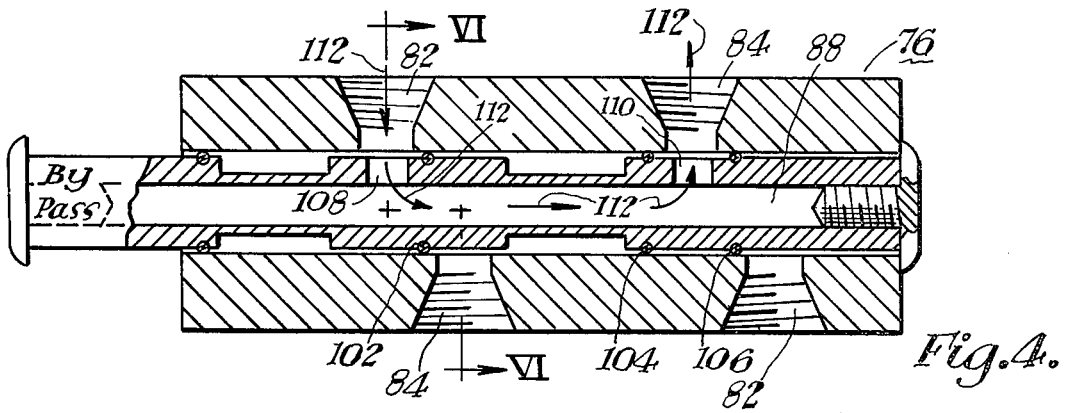
FIG. 4 is a longitudinally sectioned view of another form of our novel valve construction, shown here in its by-pass mode.

Depending upon a given application of the invention, a different number of housing sections abviously can be employed, or the housing can be made integrally after the manner of FIGS. 4 and 5.

The various sections of the housing 12 can be positioned and sealed by means of circular ridges 21 and recessed O-rings 23 (or seals of other useful configuration) appropriately positioned on the juxtaposed faces of the several housing sections 18–22, as shown in FIG. 1. It is important that the circular ridges 21 and recessed sealing means 23 be positioned so that the respective passage portions of the housing sections 18–22 are well mated end-to-end (and coaxially where the housing passage 16 is circular) to avoid binding of the control member 14 in the housing passage 16. For drafting simplicity items 21, 23 are omitted from FIG. 2.

The end housing sections 18 include an inwardly and transversely extending peripheral lip 26 which in cooperation with shouldered portions 28, 30 of the control member 14, serve to define the rectilinear limits of travel of the control member 14, as evident from a comparison of FIGS. 1 and 2. An end portion 32 or 34 of the control member 14 projects from one end or the other of the housing 12 for manual operation of the control member. Desirably suitable lettering on these end portions 32, 34 when projected from the housing 12, indicates at a glance the particular operating mode of the valve structure 10. In most applications, the valve structure 10 can be switched from one operating mode to the other by application of finger pressure upon the projecting end portion 32 or 34 to move the control member 14 between its limit positions as denoted by arrows 36, 38 in FIGS. 1 and 2 respectively, owing the balanced condition of pressure forces acting upon the seals 50–56 and associated control member surfaces.

As evident from FIGS. 1–3, each of the valve port sections 20 of the housing 12 includes transversely opposite pairs of inlet and outlet ports 40, 42. Each of these valve ports communicates with the housing passage 16 through interconnecting arcuate recesses 44, 46. The arcuate recesses 44 are less than 180° to afford a connecting area 25 there between (FIG. 3). Observe, however, that the arcuate recesses 44, 46 for the inlet ports 40 extend from the right sides (as viewed in FIGS. 1 & 2) of the housing sections 20, while the arcuate recesses 44, 46 for each of the outlet ports 42 extend from the left sides of the housing sections 20 are allochirally disposed in the embodiment of FIGS. 1–3. The purpose of this disposition will be evident from the following description. For the present, suffice it to say that the associated arcuate recesses 44, 46 of each pair of opposing inlet and outlet ports are offset with respect to their entrance into the longitudinal bore or passage 16 of the housing 12.

The control member 14 is provided with a shouldered portion 48 in addition to the shouldered portions 28, 30 alluded to previously. On each of the control member shoulders 28, 48, is disposed a single block V-seal 50 or 52 or other suitable sealing means such as O-rings for individually sealing the shouldered portions 28, 48 to adjacent wall surfaces of the passage 16. The larger shouldered portion 30 of the control member 14 is provided with a pair of spaced block V-seals or O-rings 54, 56 or other suitable sealing means. A comparison of FIGS. 1 and 2 reveals that the spatial arrangement of the shouldered portions 28, 30, 48 and their sealing means 50–56, at the respective limit positions of the control member 14, determines the flow of fluid through the valve structure 10 in either mode of operation. These spatial interrelationships and flow circuits through the valve structure in its by-pass (FIG. 1) and on-line (FIG. 2) modes of operation will now be described in detail.

Each of the housing sections 20 in effect includes a central sleeve section 58 which is joined to the related housing section at generally opposite locations 45 defined by the ends of the outer arcuate passages 44, as evident from FIG. 3. The inner surfaces of these sleeve members 58 form a continuation of the passage 16 of the housing 12.

A further comparison of FIGS. 1 and 2 shows that the end seals 50, 56 receprocate entirely within the end housing sections 18 respectively as the valve structure 10 is switched between its by-pass and on-line modes. The seal 50, 56 therefore seal the ends of the housing passage 16 and prevent fluid escaping along the end portions 32, 34 of the control member 14 irrespective of the operative mode of the valve structure 10 and attendant control member position.

Now, upon displacing the control member 14 to the left as viewed in FIG. 1) fluid entering the inlet port 40 of the left-hand valving section 20 is short-circuited, as it were, or by-passed directly to the outlet port 42 of the other valving section 20. In this connection the by-passed fluid (denoted by flow arrows 60) flows through the associated arcuate recesses 44, 46, of the by-passing ports and the intervening, isolated section of the housing passage 16. For greater volumetric flow, the control member 14 desirable is provided with a reduced section 62 intermediate its shouldered portions 30, 48. In the by-pass position of the control member 14, its inward seals 52, 54 sealingly engage the sleeve sections 58 (which define the offset of the associated recesses 46) of the housing sections 20 such that the outlet port of the left-hand housing section 20 is now completely isolated from the system by the sealing means 50, 52 on shouldered portions 28, 48 respectively of the control member 14, while the inlet port 40 of the other housing section 20 is isolated by the seals 54, 56 on the shouldered portion 30. The seals 53, 54 isolate the reduced control members section 62 from the balance of the valve structure 10, excepting the by-passing ports 40, 42 (FIG. 1).

On the other hand, upon movement of the control member 14 to its on-line position as shown in FIG. 2, the seal 52 and its associated shouldered portion 48 are moved into sealing engagement with the intermediate housing section 22 in prevention of any by-pass of fluid between the housing sections 20. In this position of the control member 14, both of the O-rings 54, 56 and shouldered portion 30 of the control member 14 are fully withdrawn into the right-hand end section 18 of the housing 12. The reduced control member section 62 is of sufficient length that a portion thereof remains juxtaposed to the righ-hand valving section 20 as viewed in FIG. 2 such that fluid can flow uninterruptedly between the inlet and outlet ports 40, 42 of this section as denoted by flow arrows 64 and through the related arcuate recesses 44, 46 and the adjacent, isolated portion of the housing passage 16. The relative lengths of the reduced control member sections 62, 68 depend on the internal configuration of the housing 12 and its various passages, and such lengths can be varied for a specific constructional application.

At the same time fluid can flow in a similar path between the inlet and outlet ports 40, 42 of the left-hand valving section 20 as denoted by flow arrows 66. To facilitate volumetric flows, the control member 14 is provided with a second reduced portion 68 which is now juxtaposed to the left-hand valving section 20. Although the inlet and outlet ports of the valving sections 20 are shown as relatively reversed, it is contemplated that the fluid paths 64, 66 of the "on-line" fluid circuit obviously can proceed in the same lateral direction through the valving structure 10, in a given application.

As noted previously fluid pressures acting upon the control member 14 are balanced such that there is no net longitudinal force imposed upon the control member and its seals. For example in FIG. 1 the by-passed fluid (arrows 60) exerts equal and opposite pressures upon the adjacent faces of the seals 50–56 and associated surfaces of the control member 14. These forces therefore cancel one another out, and the net thrust acting upon the control member 14 is zero. Similarly in FIG. 2 fluid pressures of the fluid path 64 are exerted equally and oppositely upon the adjacent seals 52–54, while the fluid pressures of the fluid path 66 are similarly exerted upon the seals 50–52. Fluid pressures are thus cancelled in the on-line mode also.

Figure 1A:
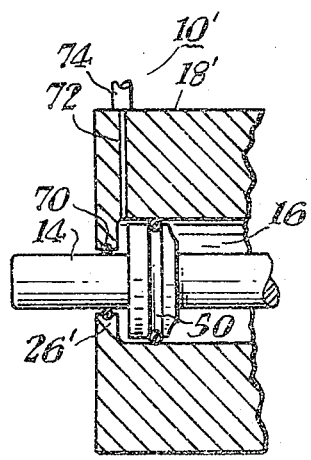
FIG. 1A is a partial longitudinally sectioned view of a modification of the valve structure shown in FIG. 1.

In the aforedescribed valve structure 10 the control member 14 is arranged for manual manipulation. However, our novel valve structure can be readily converted to remote operation as illustrated by valve structure 10' of FIG. 1A. In the latter arrangement one or both end housing sections 18A is provided with suitable sealing means such as an O-ring 70 desirably on its lip portion 26'. That portion of the housing passage 16' extending between the seal 70 and the adjacent control member seal 50 or 56 is coupled to a source of pressurized operating fluid through passage 72 and conduit 74. Owing to the ease of manipulation of control member 14, the conduit 74 can be coupled to a source of control fluid at relatively low pressure. Suitable control circuitry (now shown) can be coupled to the conduit 74.

Figure 6:
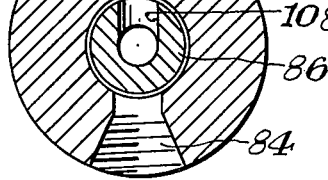
FIG. 6 is a cross-sectional view of the valve structure as shown in FIG. 4 and taken along reference line VI—VI thereof.

In FIGS. 4–6 another form of our novel valve structure 76 is illustrated. By-pass and on-line modes of the valve structure 76 are illustrated in FIGS. 4 and 5 respectively, and are analogous to the respective modes of FIGS. 1 and 2. In the arrangement of FIGS. 4–6 a one-piece housing 78 can be utilized most readily, as its passage or bore 80 is uniformly continuous save for junction with a pair of inlet ports 82 and a pair of outlet ports 84. Desirably the outlet ports 84 are inwardly offset with respect to the inlet ports 82 to facilitate isolating one pair of inlet and outlet ports 82, 84 from the remaining, inactive ports during the by-pass mode of operation (FIG. 4). As in the valve structure 10 of the preceding figures the ports 82, 84 can be tapped for securance of conplementarily threaded piping thereto.

The valve structure 76 is similarly provided with a rectilinear control member 86, provided in this case however with a longitudinal bore or passage 88. Each end of the control member passage 88 is closed and sealed by a suitable fastener 90 having a head or flange portion 92. The head 92 desirably overhangs the control member 86 and upon engagement respectively with end wall surfaces 94 of the housing 78 delimit a range of movement of the control member 86. The control member is further provided with a pair of spaced, necked-down portions 96, 98 (which in this case can be approximately the same in length), a number of seals 110–106, and a pair of lateral openings 108, 100 through which the internal passage 88 of the control member 86 communicates with the housing bore 80. The seals 100–106 can take the form of the sealing means 50–56 or 70 alluded to above.

As evident from FIG. 4 the control member passage 88 and its lateral openings 108, 110 provide a fluid path from one of the inlet ports 82 to one of the outlet ports 84 (flow arrows 112) when the structure 76 is in its by-pass mode. At this time the lower pair of inlet and outlet ports 82, 84, as viewed in FIG. 4, are isolated from the upper pair of inlet and outlet ports 82, 84 by seals 102, 104, 106.

On the other hand when the valve structure 76 is in its on-line mode (FIG. 5) the left-hand inlet and outlet ports (as viewed in FIG. 5) are isolated from the right-hand inlet and outlet ports by means of seal 102. At this time, although the left-hand ports 82, 84 have access to the lateral opening 108 of the internal control member passage 88 the other lateral opening 110 thereof is isolated by seals 104, 106. Accordingly two generally parallel fluid paths now extend transversely through the valve housing 78. The first such path (arrows 114) enters the left-hand inlet port 82 flows around the outer surface of the control member 86, for which reduced control member section 96 is desirably provided, and exits through the left-hand port 84. Similarly the other flow path (arrows 116) flows between the right-hand pair of inlet and outlet ports and around reduced control member section 98. As noted previously the flow path 114 is isolated by seals 100, 102, while the flow path 116 is demarcated by seals 102, 104. The hydrostatic forces acting upon the control member 86 are balanced in much the same manner as these acting upon the control member 14 of the preceding figures. The valve structure 76 can be similarly arranged for remote operation, after the manner of FIG. 1A.

Figure 7:
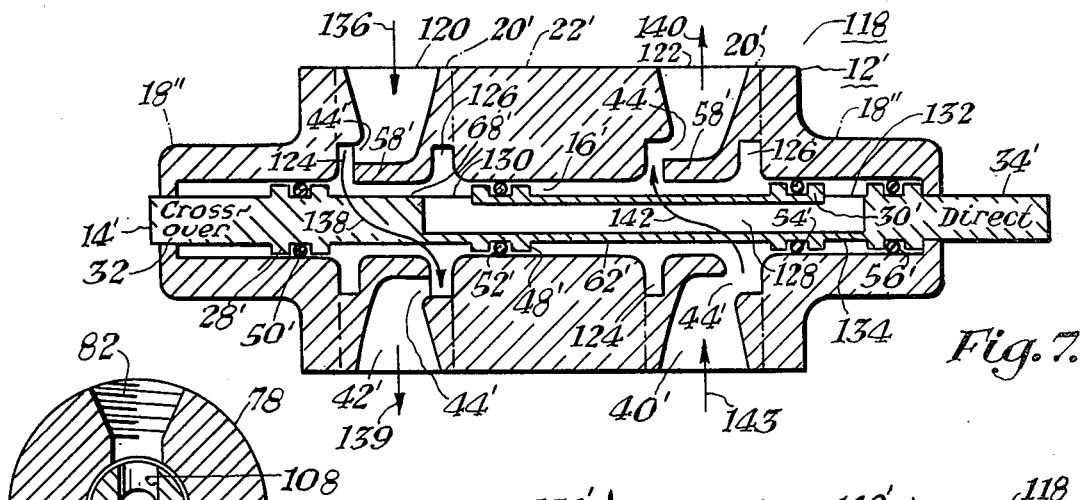
FIG. 7 is a longitudinally sectioned view of still another form of our novel valve structure, shown here in its "direct" mode.
Figure 8:
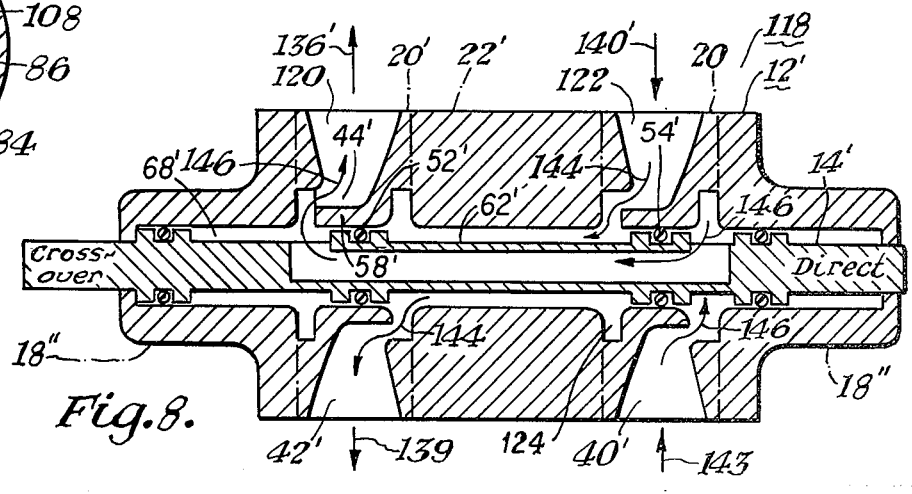
FIG. 8 is a similar view of the valve structure of FIG. 7, but shown here in its "cross-over" mode.

In FIGS. 7 and 8 of the drawings is illustrated another form of our novel valve structure 118 including housing 12' and control member 14'. The housing 12' of the valve structure 118 is generally similar to the housing 12 of FIGS. 1–3 and can if desired be fabricated from a number of component housing sections as befits manufacturing procedures and as denoted by chain-outlines defining end housing sections 18'', intermediate housing section 22' and a pair of valving sections 20'. The valving 20' are generally similar to the sections 20 of FIG. 1 except that the valving sections 20' of FIGS. 7 and 8 are not allochirally disposed. When the housing 12' is provided as preferred in discrete sections, they can be initially aligned, joined and sealed after the manner of FIG. 1.

Most importantly, it should be pointed out that the housing 12 of FIGS. 1–3 and the housing 12' of FIGS. 7 and 8 can be fabricated from identical housing sections 18–20 or 18'–20' respectively. The end housing sections 18 or 18' can be made identical either as fully dimensioned as in FIGS. 1–3 or with necked down outer portions as in FIGS. 7 and 8. As noted previously the valving sections 20 of FIGS. 1–3 are identical, and likewise the valving sections 20' of FIGS. 7 and 8. It is also contemplated that each valving section 20 can be machined or preferably molded identically with each valving section 20' of FIGS. 7 and 8. Thus, to adapt the housing 12 or 12' to the by-pass mode (FIGS. 1–3) two of the valving sections 20 or 20'' are allochirally disposed and separated by the intervening housing section 22 or 22' as in FIGS. 1–3 as noted previously. On the other hand to adapt the housing to the cross-over mode of FIGS. 7 and 8, it is only necessary to turn one of the valving sections 20 or 20' 180° (with respect to its position in the by-pass mode of FIG. 1 or 2) to obtain the spaced, tandem arrangement of the valving sections 20' of FIGS. 7 and 8. Thus, the crossover housing of FIGS. 7 and 8 can be readily converted to the by-pass housing of FIGS. 1–3. More importantly manufacture of these housing is unexpectedly simplified, as the housing sections 18–20 or 18'–20' can be utilized in either case. With a view to facilitating manufacture, the same three housing section molds can therefore be employed to produce the by-pass housing 12 of FIGS. 1–3 or the crossover housing 12' of FIGS. 7 and 8.

The housing 12', when thus arranged, is provided with a pair of upper cross-over ports 120, 122 and lower inlet and outlet ports 40', 42'. In other applications of the invention, it will be appreciated that the lower ports can be both outlet ports or both inlet ports as required. Each of the ports 40', 42', 120, 122 communicates with the central, longitudinally extending housing passage 16' through its associated arcuate recesses 44' and an inner circumferential recess 124 or 126.

The control member 14' is generally similar to the control member 14 of FIGS. 1–3, but is provided additionally with a longitudinally extending internal passage 128 communicating with the housing bore 16' through a pair of spaced, lateral openings 130, 132. Also after the manner of FIGS. 1–3 the control member 14' is provided with seals 50', 52', 54',56' disposed respectively on shouldered portions 28', 48', 30'. The lateral opening 132 of the control member 14' opens onto the shoulder portion 30' thereof. The other lateral opening 130 opens onto recess 68' of the control member 14'. It is not necessary in every case to provide a reduced portion on the shoulder 30' to facilitate flow through the lateral opening 132. Such flow is facilitated by circumferential recess 126 of the right-hand valving section 20' when the control member opening 132 is juxtaposed thereto as in FIG. 8.

The outer contour of the control member 14' can be made identical to that of the control member 14 of FIGS. 1–3, in order to simiplify manufacture and to minimize inventory of component parts for the bypass and crossover modifications of the valve structure. To adapt the bypass control member of FIGS. 1–3 to the crossover control member 14' of FIGS. 7 and 8, it is only necessary to bore the longitudinal passage 128 and its lateral opening 130, 132. Such passage can be bored through one end of the control member 14' and plugged (not shown). Accordingly where the control members 14, 14' are molded from a suitable structural plastic, such as nylon, it is necessary to provide only a single mode for manufacture of the control members of FIGS. 1–3 and 7 and 8.

The end seals 50', 56' seal the end portions of the housing passage 16' after the manner described previously in the FIGS. 1–3 modification. In the direct flow operative mode (FIG. 7), a fluid circuit path is established between the left cross-over port 120 and the opposed outlet port 40' as denoted by flow arrows 136, 138, 139. This flow passes around the reduced section 68' which is isolated by seals 50', 52' of the control member 14'. Although the lateral opening 130 is accessible to the flow path 136–138 there is not flow through the internal passage 128 of the control member 14' as its other lateral opening 132 is isolated by seals 54' 56' in the direct flow position of the control member 14'.

Also in the direct flow position, fluid flows transversely of the housing 12' (arrows 140, 142, 143) between the inlet port 40' and the other cross-over port 122. In this case Fluid flows around the reduced portion 62' of the control member. which portion is isolated by seals 52', 54'. In each path 136–139 and 140–143 of the direct fluid circuit fluid travels between the arcuate recessed 44' of each valving section 20' and through the associated circumferential recesses 124, 126 and the intervening portion of the housing passage 16'.

In the cross-over mode of operation as shown in FIG. 8 the control member 14' has been moved to the left such that seals 52', 54, engage the central sleeve members 58' of the valving sections 20'. The lateral opening 130 of the control member and its recessed portions 68' continue to communicate with the left cross-over port 120, its arcuate recess 44' and circumferential recess 124. However the outlet port 42' and its associated recesses are isolated from the left cross-over port 120 by seal 52', but now communicate with the right cross-over port 122 through its arcuate recess 44' and circumferential recess 124 and around the control member reduced portion 62' (arrows 139, 140, 144).

On the other hand the inlet port 40' is isolated from the right cross-over port 122 by O-ring 54' but communicates through lateral control member opening 132, its recess 134, the internal control member passage 128 and its other later opening 130 with the left cross-over port 120 (arrows 136, 143, 146). Communication of the inlet port 40' and its recesses 44', 126 with the internal control member passage 128 is isolated from the balance of the valve structure 118 by O-rings 54', 56'. Similarly seals 50', 52' isolate the communication of the left cross-over port 120 with the lateral control member opening 130.

The several reduced control member portions such as 62 and 68 in FIG. 1 62' 68' and 134 in FIG. 7, and the related reduced control member portions in the remaining figures can be omitted in those applications wherein sufficient radial clearance exists between the fully dimensioned control members and the various housing passages for adequate volumetric flow. Such clearance will, in a large measure, be determined by the particular configurations of the control members sealing means, such as the seals 50–56 of FIG. 1, spaced along the length of the control member.

In the several modifications of our invention, the use of the various arcuate recesses instead of circular orifices greatly facilitates machining or molding champfered or rounded edges at these recesses. Such ease of manufacturing is enhanced further by disposition of the various recesses and other transverse passages, which open onto the internal housing passage of the valve, at one or more of the junctions between the discrete housing sections, when used. Use of such champfered or rounded edges is virtually essential to prevent tearing or undue wearing of the seals of the control member.

By making these arcuate recesses, when used, somewhat less than 180° in lateral or circumferential extent adequate flow volume is not only attained with minimal fluid friction, but in addition a pair of the arcuate recesses can be closely and unexpectedly juxtaposed on opposite sides respectively of the valve housing without loss of structural integrity.

It will be understood that one of the valve ports, such as the upper port 40 of FIG. 1 the lower port 82 of FIG. 5 or the port 42' FIG. 7 can be liminated from our novel valve structure in these applications wherein a three-way valve function is desired. It will also be understood that the valve construction housing can be further elongated and additional pairs of laterally opposite ports can be spaced along the length of such housing, together with a corresponding increase in the length of the control member and additional sealing means thereon. In this way three or more flow paths through the valve structure can be attained, within the teachings of the present invention.

From the foregoing it will be seen that a novel and efficient Multi-purpose Valve Structure has been disclosed herein. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to unexpected advantage without a corresponding use of other features hereof.

We claim:

1. A valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means nonuniformly spaced along the length of said control member for movement therewith, each of said sealing means sealingly engaging adjacent wall surfaces of said passage means, said sealing means in one position of said control member defining a given flow circuit among said valve ports, said sealing means in another position of said control member defining a different flow circuit among said valve ports, and transversely juxtaposed pairs of said valve ports communicating through respective pairs of recesses with said passage means, each pair of said recesses being defined by a pair of transversely opposed substantially circular members mounted in said housing, said circular members being axially elongated to partially define said passage means.

2. A valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means nonuniformly spaced along the length of said control member for movement therewith, each of said sealing means sealingly engaging adjacent wall surfaces of said passage means, said sealing means in one position of said control member defining a given flow circuit among said valve ports, said sealing means in another position of said control member defining a different flow circuit among said valve ports, said control member being provided with at least two reduced portions of unequal lengths and spaced along the length of said control member in delineation of said flow circuits in cooperation with said sealing means at respective positions of said control member, two pairs only of said ports disposed in said housing, said reduced control member portions being disposed in one position of said control member to define said given fluid circuit as comprising two generally parallel flows through respective generally transversely juxtaposed pairs of said ports and across said reduced control member portions respectively, one of said reduced portions having sufficient length to define said different circuit in another position of said control member as a by-passing flow along said one reduced portion and between an axially adjacent pair of said ports, said control member sealing means being disposed in said other position to seal off the remainder of said ports, said housing and said passage means extending longitudinally and outwardly of each side of the array of said ports, one of said control member sealing means being positioned within each of said housing extensions in continuous sealing contact therewith to prevent leakage from either end of said housing, at least one end of said control member protruding outwardly through opening means in said housing extensions for an indication of control member position.

3. The combination according to claim 2 wherein additional sealing means are mounted on at least one of said housing extensions at a location longitudinally outwardly of said one sealing means, and conduit means extending through said housing and communicating with said passage means at a point between said additional sealing means and said one control member sealing means for admitting a pressurized fluid for remote operation of said control member.

4. A valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means nonuniformly spaced along the length of said control member for movement therewith, each of said sealing means sealingly engaging adjacent wall surfaces of said passage means, said sealing means in one position of said control member defining a given flow circuit among said valve ports, said sealing means in another position of said control member defining a different flow circuit among said valve ports, said control member being provided with at least two reduced portions of unequal lengths and spaced along the length of said control member in delineation of said flow circuits in cooperation with said sealing means at respective positions of said control member, two pairs only of said ports disposed in said housing, said reduced control member portions being disposed in one position of said control member to define said given fluid circuit as comprising two simultaneous discrete but generally parallel transverse flows through respective generally transversely juxtaposed pairs of said ports and across said reduced control member portions respectively, one of said reduced portions having sufficient length to define said different circuit in another position of said control member as a single by-passing flow along said one reduced portion and between an axially adjacent pair of said ports, said control member sealing means being disposed in said other position to seal off the remainder of said ports.

5. The combination according to claim 1 including two pairs of said ports disposed in said housing, said control member being provided with at least two reduced portions of unequal lengths and spaced along the length of said control member in delineation of said flow circuits in cooperation with said sealing means at respective positions of said control member, said reduced control member portions being disposed in one position of said control member to define said given fluid circuit as comprising generally parallel flows through respective generally transversely juxtaposed pairs of said ports, and a longitudinal passage extending internally of said control member, said internal passage having openings juxtaposed respectively to a non-juxtaposed pair of said ports in another position of said control member to define a crossover flow between said non-juxtaposed ports in provision of said second fluid circuit.

6. The combination according to claim 1 wherein at least one pair of generally opposite housing ports are offset with respect to one another so that an associated one of said sealing means can be positioned sealingly therebetween at one position of said control member to isolate said offset pair of ports one from the other.

7. A valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means nonuniformly spaced along the length of said control member for movement therewith, each of said sealing means sealingly engaging adjacent wall surfaces of said passage means, said sealing means in one position of said control member defining a given flow circuit among said valve ports, said sealing means in another position of said control member defining a different flow circuit among said valve ports, said control member being provided with at least two reduced portions of unequal lengths and spaced along the length of said control member in delineation of said flow circuits in cooperation with said sealing means at respective positions of said control member, two pairs only of said ports disposed in said housing, said reduced control member portions being disposed in one position of said control member to define said given fluid circuit as comprising two generally parallel flows through respective generally transversely juxtaposed pairs of said ports and across said reduced control member portions respectively, one of said reduced portions having sufficient length to define said different circuit in another position of said control member as a by-passing flow along said one reduced portion and between an axially adjacent pair of said ports, said control member sealing means being disposed in said other position to seal off the remainder of said ports, said housing being provided in a plurality of sections, said sections being laterally aligned and sealed to one another by circular ridge and recessed sealing means on juxtaposed faces of said housing sections.

8.. The combination according to claim 1 including at least two transversely juxtaposed pairs of said ports, said different fluid circuit including a pair of cross-over fluid paths, one of said cross-over paths extending between a given non-juxtaposed pair of ports on opposite sides of said housing, the other cross-over path extending between another non-juxtaposed pair of said ports through an internal passage of said control member.

9. The combination according to claim 8 wherein said control member passage extends between spaced reduced portions of said control member, said passage opening onto said reduced portions in communication with said passage means.

10. A valve structure comprising an elongated housing having passage means extending therethrough, a control member mounted in said passage means for rectilinear movement with respect to said housing, said housing having a plurality of spaced valve ports extending laterally therethrough in communication with said passage means, a plurality of sealing means nonuniformly spaced along the length of said control member for movement therewith, each of said sealing means sealingly engaging adjacent wall surfaces of said passage means, said sealing means in one position of said control member defining a given flow circuit among said valve ports, said sealing means in another position of said control member defining a different flow circuit among said valve ports, said control member being provided with at least two reduced portions of unequal lengths and spaced along the length of said control member in delineation of said flow circuits in cooperation with said sealing means at respective positions of said control member, two pairs only of said ports disposed in said housing, said reduced control member portions being disposed in one position of said control member to define said given fluid circuit as comprising two generally parallel flows through respective generally transversely juxtaposed pairs of said ports and across said reduced control member portions respectively, one of said reduced portions having sufficient length to define said different circuit in another position of said control member as a by-passing flow along said one reduced portion and between an axially adjacent pair of said ports, said control member sealing means being disposed in said other position to seal off the remainder of said ports, transversely juxtaposed pairs of said valve ports communicating through respective pairs of recesses with said passage means, each pair of said recesses being defined by a pair of transversely opposed substantially circular members mounted in said housing, said circular members being axially elongated to partially define said passage means.

11. The combination according to claim 1 wherein said housing is provided with discrete identical valving sections shaped for allochiral disposition with respect to one another in a given valving mode and for tandem disposition with respect to one another in a different valving mode.

12. The combination according to claim 1 wherein said housing includes a pair of discrete but identical valving housing sections and a pair of discrete but identical end housing sections, said valving sections being separated by an intermediate housing section.

13. The combination according to claim 12 including said housing sections being laterally aligned and sealed to one another by circular ridge and recessed sealing means outwardly surrounding said housing passage means and mounted on juxtaposed faces of said housing sections.

14. The combination according to claim 10 wherein each of said recesses and said passage means are generally circular in cross-section, and each of said recesses extends slightly less than 180° about said passage means for structural integrity of said housing.

15. The combination according to claim 1 including two pairs of ports disposed in said housing, said reduced control member portion being disposed in one position of said control member to define said given fluid circuit as comprising generally parallel flows through respective generally transversely juxtaposed pairs of said ports and across said reduced control member portions respectively, one of said reduced portions having sufficient length to define said different circuit in another position of said control member as a by-passing flow along said one reduced portion and between an axially adjacent pair of said ports, said control member sealing means being disposed in said other position to seal off the remainder of said ports.

16. The combination according to claim 11 wherein each of said valving sections is provided with a pair of said transversely juxtaposed valve ports and a pair of said transversely opposed substantiallly semicircular members.

17. The combination according to claim 16 wherein said substantially semicircular members terminate short of the sides respectively of the associated valving section for communication between said passage means and the associated recesses respectively.

* * * * *